Jan. 2, 1968  A. NECTOUX  3,361,228
LEVER AND DISC MOUNTING MEANS FOR A DISC BRAKE
Filed March 17, 1966  2 Sheets-Sheet 2

# United States Patent Office 3,361,228
Patented Jan. 2, 1968

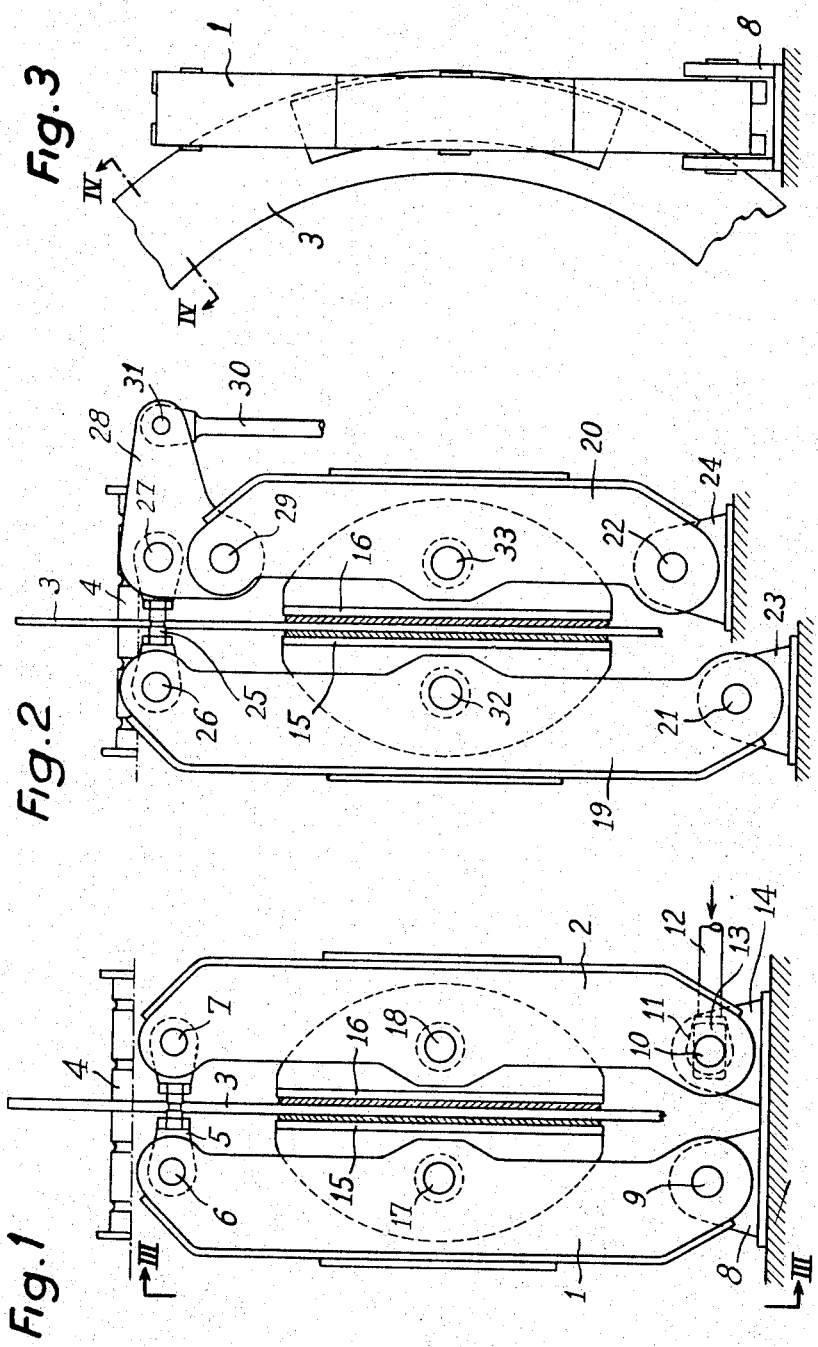

3,361,228
LEVER AND DISC MOUNTING MEANS FOR A DISC BRAKE
André Nectoux, Le Creusot, France, assignor to Societe des Forges et Ateliers du Creusot, Paris, France, a corporation of France
Filed Mar. 17, 1966, Ser. No. 535,238
Claims priority, application France, Mar. 31, 1965, 11,381
2 Claims. (Cl. 188—73)

ABSTRACT OF THE DISCLOSURE

A hoisting machine drum has a disc rigidly secured to it which disc is gripped between two brake shoes. Each brake shoe has a shoe carrier with the carriers interconnected at one end by an articulation system and the other end of each carrier pivots on a spindle. The spindles of the articulation system, the shoe carrier pivot spindles, and the shoe articulation spindles are parallel. The disc is a ring secured to a collar which is secured to the drum with male and female tenon devices securing the ring to the collar. Alternately, the disc is secured to the collar by bolts and resilient elements compressed by the bolts.

---

This invention relates to a disc brake for a hoisting machine, more particularly for winding engines.

Hoisting machines of this kind comprise a disc which is rigidly secured to the rotating drum of the machine and which is grippable between two shoes, two shoe carriers being interconnected at one of their ends by an articulation system and each pivoting at their other end around a spindle. One shoe is articulated to each shoe carrier, and the spindles of the articulation system and the shoe carrier pivot spindles and the shoe articulation spindles are parallel.

Disc brakes of this kind have various disadvantages; more particularly, the disc experiences an axial thrust when the coefficients of friction on each side of the disc are different.

The disc brake according to the invention obviates this disadvantage. According to the invention, the articulation and pivoting spindles or pivots at the ends and the shoe pivot are coplanar for each shoe carrier.

The invention will now be described in greater detail with reference to exemplary embodiments shown in the drawings. Other features and advantages of the invention will be disclosed by the following description.

In the drawings:

FIGURE 1 is a view in elevation of the disc brake according to the invention as used for a winding engine whose drum is shown only diagrammatically and partly;

FIGURE 2 shows a variant, the view being similar to FIGURE 1;

FIGURE 3 is a view on the line III—III of FIGURE 1 and shows the position of the brake shoes relatively to the disc;

Figure 4:
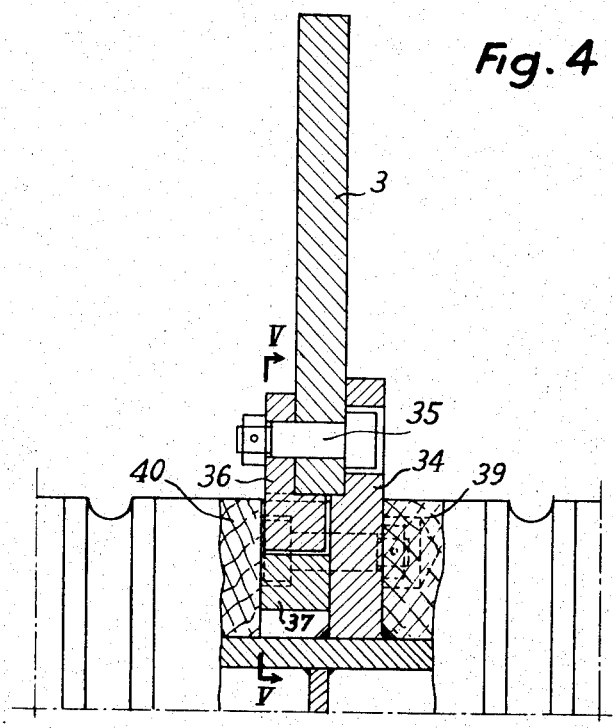
FIGURE 4 is a section on the line IV—IV of FIGURE 3 at a place where means for locking the disc to the drive, in order that the disc may rotate solidly therewith, are disposed.

FIGURE 1 shows a disc brake according to the invention comprising two shoe carriers 1, 2, which are identical and which are disposed on either side of a disc 3 fixed to the Koëpe pulley 4 of a winding engine. The two shoe carriers 1, 2 are interconnected at one of their ends by a rod 5 whose length can be adjusted and which is articulated to each shoe carrier by way of a respective pivot pin 6, 7. The shoe carrier 1 is articulated to a stationary support member 8 by way of a spindle 9. The shoe carrier 2 is articulated to a spindle 10 borne by a pin 11 of an actuating rod 12, the spindle 10 being adapted to move in a slot 13 in a stationary support member 14. The brake is operated by the rod 12. Each shoe carrier 1, 2 has a shoe 15, 16 respectively, the shoes being articulated to their respective carriers by a respective spindle 17, 18. The spindle or pivot 17 is disposed midway between the spindles or pivots 6 and 9, and the spindle or pivot 18 is disposed midway between the spindles or pivots 7, 10.

According to the invention, the spindles or pivots 6, 17, 9 are coplanar with one another and the spindles or pivots 7, 18, 10 are coplanar with one another. Also, all these spindles or pivots are parallel to one another. This feature prevents the disc from having to experience axial thrust. With articulations which are not coplanar in respect of each shoe carrier, the axial components of the forces developed on each shoe could be equal or oppositely directed only for equal coefficients of friction. In the event of such coefficients differing from one another, the disc would experience an axial thrust. The invention obviates any such resultant axial thrust, whatever the coefficients of friction on the faces of the disc 3 may be.

FIGURE 2 shows a variant in which shoe carriers 19, 20 are of different lengths. Each shoe carrier pivots at one end on a respective spindle or pivot 21, 22 mounted on a stationary support 23, 24 respectively. At their other ends the shoe carriers 19, 20 are interconnected by an articulation system comprising a rod 25 whose length can be adjusted and which is articulated by way of a spindle 26 to the shoe carrier 19, and by a spindle 27 on a rocker 28 which is articulated by way of a spindle 29 to the shoe carrier 20. The brake is applied by a rod 30 which is pivotally connected to the rocker 28 at a place 31. Shoes 15, 16 are articulated to their respective carriers 19, 20 by way of spindles 32, 33. The spindle or pivot 32 is parallel to the spindles or pivots 21, 26 which are disposed at the centre of the distance which separates them and in the same plane as these two spindles. Similarly, the spindle 33 is parallel to the spindles 22, 29 which are disposed at the centre of the distance which separates them and in the same plane as these two spindles. Consequently, the forces which the shoes 15, 16 apply to the disc 3 are completely free of axial components, whatever the coefficient of friction on each individual face of the disc 3.

Figure 5:
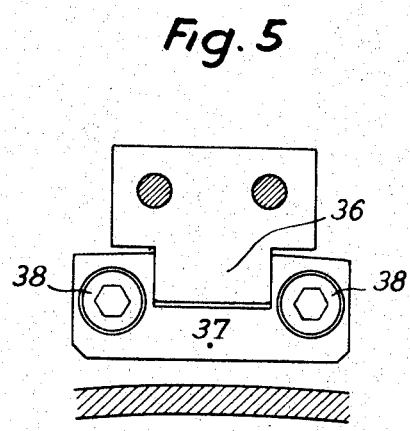
FIGURE 5 is a section on the line V—V of FIGURE 4.
Figure 6:
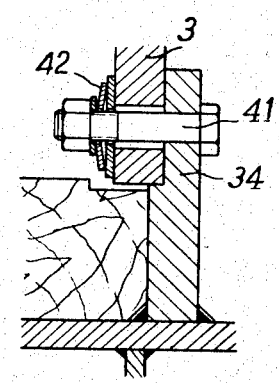
FIGURE 6 is a section similar to FIGURE 4 at a place where the disc is secured to the drum of the winding engine.

FIGURE 4 shows how the disc 3 can be locked solidly to the drum of a winding engine. The drum comprises a collar 34 to which the disc 3, in the form of a circular ring or rim, can be secured by bolts 41. To lock the disc 3 to the drum, a system comprising male and female tenons is used. One such system is shown in FIGURES 4 and 5, the male tenon 36 being secured to the disc 3 by bolts 35 and the female tenon 37 being secured to the collar 34 by bolts 38. Once the disc 3 has been secured and the male and female tenons positioned, the winding engine drum is completed by the positioning of wooden cleats. The disc 3 is secured to the collar 34 by bolts 41, and resilient members, such as resilient washers 42, are disposed on the shanks of the bolts 41. The disc 3 is therefore rotated by the tenons 36, 37 and resiliently retained axially by the bolts 41 and the washers 42.

The invention is not of course limited by details of the embodiments hereinbefore described and such details can vary without departure from the scope of the invention.

I claim:
1. A disc brake for hoisting machine having a rotating drum comprising a disc rigidly connected to said drum, two shoes for gripping said disc, two shoe carriers for said shoes, and articulation system connecting said carriers at one end, each of said carriers pivoting at their other end on a spindle, one of said shoes being articulated on each of said shoe carriers, the pivots of said articulation system, of said shoe carriers and of said shoes being parallel, the articulation and pivoting spindles at the ends of said carriers and the shoe pivots being coplanar for each of said shoe carriers, said disc being a ring having means to secure it to a collar, said securing means being a plurality of separate female tenon members secured to said collar and a plurality of a separate male tenon members secured to said disc, said collar being rigidly secured to said drum.

2. A disc brake for a hoisting machine having a rotating drum comprising a disc rigidly connected to said drum, shoes for gripping said disc, two shoe carriers for said shoes, an articulation system connecting said carriers at one end, each of said carriers pivoting at the other end on a spindle, one of said shoes being articulated on each of said shoe carriers, the pivots of said articulation system, of said shoe carriers, and of said shoes being parallel, the articulation and pivoting spindles at the ends of said carriers and the shoe pivot being coplanar for each of said carriers, said disc being a ring secured to a collar rotating rigidly with said drum, said disc being secured to said collar by bolts and resilient elements disposed on the bolt shanks compressed by said bolts.

References Cited

UNITED STATES PATENTS

| | | | |
|---|---|---|---|
| 2,291,016 | 7/1942 | Aurien | 188—59 |
| 2,334,169 | 11/1943 | Aurien | 188—59 |
| 2,375,152 | 5/1945 | Turner | 188—73 |
| 2,391,495 | 12/1945 | Wemp | 192—107 |
| 2,633,217 | 3/1953 | Carlson | 192—107 X |
| 2,913,081 | 11/1959 | Rudisch | 192—107 X |
| 3,198,292 | 8/1965 | Braeden | 188—73 |

FOREIGN PATENTS

| | | |
|---|---|---|
| 30,070 | 7/1964 | E. Germany. |
| 1,140,326 | 11/1962 | Germany. |

MILTON BUCHLER, *Primary Examiner.*

G. E. HALVOSA, *Assistant Examiner.*